Nov. 11, 1969  L. L. PREM  3,478,233
MAGNETOHYDRODYNAMIC GENERATOR
Filed Nov. 4, 1965
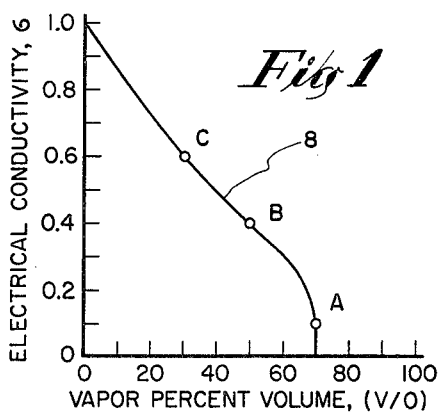
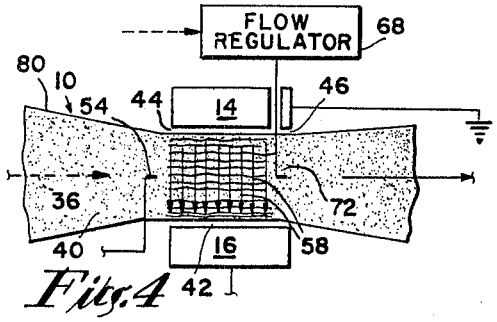
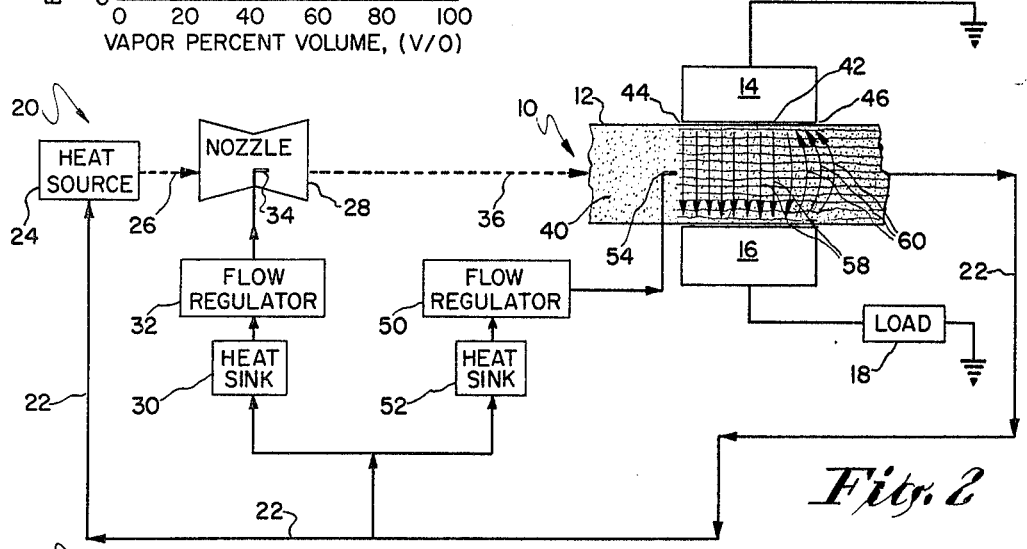
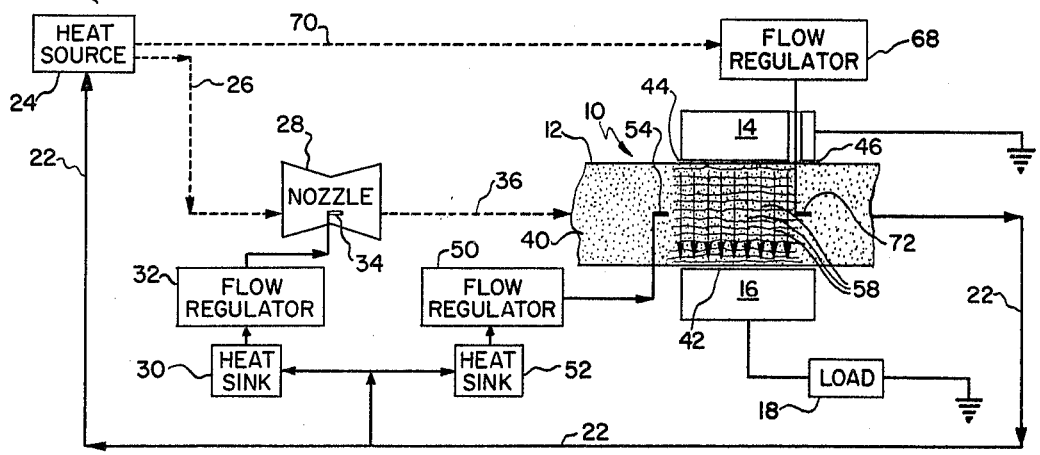
INVENTOR.
LAWRENCE L. PREM United States Patent Office 3,478,233
Patented Nov. 11, 1969

3,478,233
MAGNETOHYDRODYNAMIC GENERATOR
Lawrence L. Prem, Tarzana, Calif., assignor to North American Rockwell Corporation, a corporation of Delaware
Filed Nov. 4, 1965, Ser. No. 506,324
Int. Cl. G21d 7/02
U.S. Cl. 310—11        12 Claims

ABSTRACT OF THE DISCLOSURE

A method of and apparatus for controlling the electrical conductivity of a working fluid having liquid and vapor phases in a magnetohydrodynamic (MHD) generator by decreasing the vapor volume of the working fluid in the magnetic field region of the MHD generator so that end losses are reduced.

BACKGROUND OF THE INVENTION

MHD generators convert the kinetic energy of an electrically conductive fluid into electrical energy by moving the working fluid through a primary or applied magnetic field that is set up across the MHD generator. The interaction of the moving fluid and the primary magnetic field induces an electrical field with current flow in a direction that is mutually perpendicular to both the direction of fluid motion and the magnetic field.

The electrical power output of MHD generators is reduced by end losses, e.g. shunting or end currents, which develop at the end regions of the MHD generator. See G. W. Sutton, H. Hurwitz, Jr., and H. Poritsky, "Electrical and Pressure Losses in a Magnetohydrodynamic Channel Due to End Current Loops," AIEE Transactions-Communications and Electronics, vol. 80, Pt. I, p. 687 (January 1962); G. B. Stafford, "Liquid Metal Magnetohydrodynamics Power Conversion," ASD–TDR–63–700 (September 1963). Shunting currents are increased by the presence of an electrically conductive working fluid at the end regions, i.e. the entrance and exit regions, of a linear MHD generator. The conductive fluid at the entrance and exit regions provides a shunt path in parallel with the conductive fluid that is within the generator region. Since the shunting currents dissipate electrical power in the end regions, an undesirable power loss is experienced by the MHD generator.

It is well-known in the prior art to use various mechanical arrangements to reduce end losses similar to those which develop in the end regions of a MHD generator. For example, magnetic field extensions can be used to extend the magnetic field beyond the generator region which reduces the effect of shunting currents. However, this increases a non-power producing pressure drop across the MHD generator which affects the efficiency of the generator. Similar magnetic field extensions are used in the electromagnetic pumps which experience similar end losses; for example, see U.S. Patent No. 2,936,711 to D. A. Watt.

Suitable guide vanes can also be positioned in the end regions of the MHD generator to substantially reduce or block the shunting currents. However, the introduction of these guide vanes into the working fluid develops both undesirable friction losses and an unsteady working fluid flow. This increases the pressure drop across the MHD generator. If the working fluid is a liquid metal and the guide vanes are formed from iron or steel, the vanes will rapidly deteriorate and have a relatively short operating life. Similar guide vanes are used in electromagnetic pumps; for example, see U.S. Patent No. 2,756,678 to G. D. Collins.

OBJECTS OF THE INVENTION

Accordingly, it is an object of the present invention to provide a new and improved method of and apparatus for controlling the electrical conductivity of a working fluid in a MHD generator.

A further object is to provide a method of and apparatus for reducing undesirable end effects in a MHD generator.

An additional object is to provide a method of and apparatus for reducing end effects in a MHD generator without significantly altering the steady-flow characteristics of a working fluid.

SUMMARY OF THE INVENTION

Briefly, in accordance with my invention, a new and improved method of and apparatus for controlling the electrical conductivity of a working fluid in a MHD generator is provided wherein the selective injection of a predetermined volume of fluid into the steady flow of a working fluid at least at the entrance region to the magnetic field region of the MHD generator alters the electrical conductivity of the working fluid to reduce end losses without any appreciable effect on the steady-flow characteristics of the working fluid.

One particular form of magnetohydrodynamic energy conversion system in which my present invention can find particular use is disclosed in U.S. Patent No. 3,320,444, issued May 16, 1967 and assigned to the same assignee as the present invention.

Further objects, features, and the attending advantages of the invention will become more readily apparent when the following description is read in view of the accompanying drawing.

BRIEF DESCRIPTION OF THE DRAWING

FIGURE 1 is a graph of the relationship between the electrical conductivity of one working fluid and the volume percent vapor of the fluid;

FIGURE 2 is a schematic of one form of a new and improved MHD generator formed in accordance with the present invention and connected into a magnetohydrodynamic energy conversion system;

FIGURE 3 is a schematic of another form of a new and improved MHD generator formed in accordance with the present invention and connected into the magnetohydrodynamic energy conversion system of FIGURE 2; and FIGURE 4 is a schematic of another form of a new and improved MHD generator formed in accordance with the present invention and connected into the magnetohydrodynamic energy conversion system of FIGURE 3.

DESCRIPTION OF THE INVENTION

Referring now to the drawing, curve 8 of FIGURE 1 graphically represents the relationship between the electrical conductivity of a working fluid having at least two phases, i.e. vapor and liquid phases, suitable for use in a magnetohydrodynamic system, and the vapor percent of the total volume of working fluid. See AIAA Paper No. 64–760, D. G. Elliott, D. J. Cerini, and E. Weinberg, "Investigation of Liquid MHD Power Conversion," Third Biennial Aerospace Power Systems Conference (Sept. 1–4, 1964). The two-phase working fluid at point A on curve 8 is vapor rich, approximately 70% vapor. It can be seen from curve 8 that the electrical conductivity of a vapor-rich fluid, such as 70% vapor, is relatively inferior since the molecules of the liquid phase are widely separated by the vapor phase. However, a liquid-rich fluid has a relatively superior conductivity since the molecules are compacted. Therefore, the electrical conductivity of the working fluid at point C on curve 8 is relatively superior because approximately 70% of the total volume is liquid.

Referring to FIGURE 2, one form of MHD generator 10 has a suitable conduit 12 positioned between external conductors or current collectors 14 and 16 that can be, for example, either electrodes in direct contact with the marking fluid or induction coils that are inductively coupled to an electrical current generated in the working fluid, or the like. Current collectors 14 and 16 are electrically connected to an external load 18 in a conventional manner. Conduit 12 is physically connected to a magnetohydrodynamic system 20 which can be similar to that described in U.S. Patent No. 3,320,444.

Conduit 22 of the magnetohydrodynamic system 20 introduces a working fluid containing one or more components, at least one of which is vaporizable, into a suitable and conventional heat source 24. The working fluid is raised to a temperature equal to or higher than the vaporization temperature thereof by the heat source 24 so that the working fluid is partially vaporized and in the system as shown becomes a two-phase mixture, i.e. having both vapor and liquid phases. The two-phase working fluid passes as a vapor-rich mixture, as schematically shown by dashed line 26, to a nozzle means 28 which increases the kinetic energy of the working fluid. The vapor phase entering the nozzle means 28 can be either wet, saturated, or superheated. The nozzle means 28 converts the thermal energy of the partially vaporized working fluid into kinetic energy so that a high velocity, working fluid stream results.

In the preferred magnetohydrodynamic system 20 as shown, a liquid portion of the working fluid passing through conduit 22 to the heat source 24 is fed to a conventional heat sink 30 which subcools the liquid. A separate source of liquid is also contemplated. The subcooled liquid is conducted through a pressure or flow regulator 32 and injected into the nozzle means 28 at point 34. The injection of subcooled liquid is controlled by the regulator 32 so that the resulting working fluid passing from the nozzle means 28 has been adjusted and is vapor rich; for example, approximately 70% vapor as schematically shown by dashed line 36. The vapor-rich working fluid with approximately 70% vapor per volume (see point A on curve 8 of FIGURE 1) is, therefore, electrically non-conductive, i.e. a relatively inferior electrical conductor as schematically indicated at 40.

Conduit 12 passes this vapor-rich working fluid 40 perpendicular to a plane defined by the current collectors 14 and 16, and perpendicular to a primary magnetic field that is set up across the generator region 42 of the MHD generator 10 by a conventional magnetic means such as magnetic poles (not shown) spaced apart by the conduit and normal to the plane of the drawing. The fluid flow, the external conductors, and the primary magnetic field are mutually perpendicular in accordance with conventional MHD generator principles.

End effects, in particular shunting end currents, are experienced at the entrance region 44 and at the exit region 46 of a MHD generator, such as generator 10, when the working fluid is a relatively superior electrical conductor. Since the working fluid has been adjusted to be a relatively poor electrical conductor at 40, as previously described, a shunt path does not exist across the entrance region 44 of the MHD generator 10. Consequently, shunting currents in the entrance region 44 are substantially reduced which increases the electrical power output of the MHD generator 10 as shown by FIGURE 1.

It is well known, however, that the generator region 42 of MHD generator 10 must "see" an electrically conductive working fluid to generate an electrical current. That is, the working fluid within the generator region 42 must be a relatively superior electrical conductor such as a liquid-rich fluid. Since the electrical conductivity of the working fluid at the entrance region 44 is relatively inferior or poor, the electrical characteristics of the working fluid must again be altered so that the working fluid becomes a relatively superior electrical conductor as the fluid passes through the generator region 42.

The electrical characteristics of the working fluid are altered from a relatively inferior electrical conductor (vapor-rich fluid) to a relatively superior electrical conductor (liquid-rich fluid) in my invention by the controlled injection of liquid, preferably subcooled, into the stream of vapor-rich working fluid 40. A flow or pressure regulator 50 controls the conditions for the injection of a predetermined volume of liquid that passes from conduit 22 through a conventional heat sink 52. Heat sink 52 is similar to heat sink 30 and it is contemplated that heat sink 52 can be eliminated where the system parameters do not require additional heat exchange capacity. It is contemplated that each flow regulator 32 and 50 could receive liquid from a common heat sink. The injection of liquid is generally at point 54 which is adjacent the entrance region 44 of the MHD generator 10. The location of point 54 is dependent upon the system parameters such as working fluid velocity, thermal characteristics of the working fluid, type of working fluid, or the like. The injection of liquid at point 54 is preferably in a direction that is parallel to the flow direction of the working fluid. However, injection in the opposite direction or at an angle to the flow direction is also contemplated. Multiple injections at or near the entrance region can also be used.

The controlled injection of liquid at 54 increases the liquid percent of the total volume of the working fluid and decreases the vapor percent volume. It can be seen from curve 8 of FIGURE 1 that such a decrease in vapor percent volume results in a corresponding increase in electrical conductivity of the working fluid. Preferably the controlled injection of liquid at 54 alters the electrical conductivity of the working fluid from approximately point A to a region on the curve generally defined by points B and C where the working fluid is a relatively good electrical conductor. Therefore, a major fraction of the kinetic energy of the working fluid can now be transformed into electrical energy within the generator region 42 (see FIGURE 2) in accordance with well-known magnetohydrodynamic principles. The electrical current flow generated within the generator region 42 is generally indicated by the arrows 58.

The working fluid which has been altered as previously described from a relatively inferior (vapor-rich fluid) to a relatively superior (liquid-rich fluid) electrical conductor, passes from the generator region 42 through the exit region 46 and into conduit 22. As this working fluid passes through the exit region 46, shunting currents are developed as generally indicated by shunt arrows 60 since a shunt path exists in parallel with the working fluid within the generator region 42.

FIGURE 3 shows another form of my invention which substantially reduces the shunting currents at the exit region of a MHD generator. Like parts as previously described and shown by FIGURE 2 are identified by the same characters in FIGURE 3. A flow or pressure regulator 68 controls the conditions for the injection of a predetermined volume of a vapor-rich mixture, as schematically shown by dashed line 70, which passes from the heat source 24 to the regulator and is injected generally at point 72, adjacent the exit region 46. A separate source of vapor-rich fluid is also contemplated. This controlled injection of vapor increases the vapor percent of the total volume and decreases the liquid percent volume of the working fluid as the fluid passes downstream from the generator region 42. It can be seen from curve 8 in FIGURE 1 that such an increase of vapor percent volume results in a corresponding decrease in electrical conductivity of the working fluid; that is, from the region on curve 8 generally defined by points B and C to approximately point A. At point A, the working fluid has again been adjusted by my invention to become a relatively inferior electrical conductor. This substantially reduces the developed shunting currents at the exit region 48 and, therefore, reduces the electrical power loss that is experienced at the end region 46 of the MHD generator of FIGURE 2 as previously described. The substantial reduction of shunting currents from both the entrance region 44 and the exit region 46 of the MHD generator as shown by FIGURE 3 sharply increases the total efficiency of the generator and, accordingly, increases the electrical energy output.

Referring again to FIGURE 1, the controlled injection of liquid at the entrance region 44 (see FIGURES 2 and 3) and vapor at the exit region 46 does not alter the steady-flow characteristics of the working fluid as the fluid passes through the MHD generators of my invention. While the shift from point A on curve 8 to point C, for example, represents a change of approximately 40 vapor percent volume, the corresponding change by weight percent of the total volume is relatively insignificant. For example, consider potassium in both its liquid and vapor phases as the working fluid passing through the MHD generators of FIGURES 2 and 3. At 1600° F., the density of liquid potassium is approximately 40 pounds per cubic foot (lb./ft.$^3$), and of potassium vapor approximately $7 \times 10^{-2}$ lb./ft.$^3$. The following relationships, therefore, will exist at points A, B, and C on curve 8 of FIGURE 1 when potassium is the working fluid passing through the MHD generators of my invention:

|  | Point A (vapor-rich mixture) | Point B | Point C (vapor-poor mixture) |
| --- | --- | --- | --- |
| Vapor percent volume | 70 | 50 | 30 |
| Liquid percent volume | 30 | 50 | 70 |
| Working fluid: |  |  |  |
| Vapor by weight (percent) | 0.4 | 0.175 | 0.07 |
| Liquid by weight (percent) | 99.6 | 99.825 | 99.93 |

The shift from point A to point C, therefore, is obtained by increasing the liquid content of the working fluid from 99.6% to 99.93%, a 0.33 weight percent change. This is a relatively insignificant change in the total weight percent liquid so that the controlled injections into the working fluid in accordance with my invention do not adversely affect the steady-flow characteristics of the working fluid.

FIGURE 4 shows another form of my invention where like parts as previously described and shown by FIGURE 3 are identified by the same characters in FIGURE 4. The vapor percent of the working fluid can be decreased at the entrance region 44 of the magnetohydrodynamic energy conversion system by increasing the working pressure at the entrance region. The pressure increase decreases the vapor percent and, therefore, alters the electrical characteristics of the working fluid from a relatively inferior electrical conductor (vapor-rich fluid) to a relatively superior electrical conductor (liquid-rich fluid). This increase in working pressure at the entrance region 44 is accomplished in the magnetohydrodynamic energy conversion system as shown by FIGURE 4 by decreasing the cross-sectional area of conduit 80 at the entrance region of the MHD generator 10.

The increase in working fluid pressure is combined, as shown, with the controlled injection of liquid generally at point 54 which is adjacent the entrance region 44 of the MHD generator.

The vapor percent of the working fluid can be increased at the exit region 46 by reducing the working pressure at the exit region in a manner opposite to that prescribed for the entrance region 44, that is, by increasing the cross-sectional area of conduit 80 at the exit region as shown by FIGURE 4. This pressure reduction increases the vapor percent volume of the working fluid. The decrease in working fluid pressure is combined with the controlled injection of vapor generally at point 72 which is adjacent the exit region 46 as previously described and shown.

It is contemplated that the controlled injection of a fluid such as liquid at the entrance region and vapor at the exit region can be selectively omitted under certain operating parameters of the MHD generator 10 principles.

As will be evidenced from the foregoing description, certain aspects of my invention are not limited to the particular details of construction as illustrated, and it is contemplated that other modifications and applications other than those described herein will occur to those skilled in the art. It is, therefore, intended that the appended claims shall cover such modifications and applications that do not depart from the true spirit and scope of the invention.

What is claimed is:

1. In an improved magnetohydrodynamic generator, the method of generating electricity comprising:
    (a) passing an electrically non-conductive working fluid having liquid and vapor phases through a magnetic field having entrance and exit regions,
    (b) altering the electrical characteristics of said working fluid by decreasing the vapor volume of the working fluid so that the working fluid is electrically conductive within the magnetic field, and
    (c) extracting electrical energy from the interaction of the electrically conductive working fluid and the magnetic field.

2. The method of claim 1 in which the vapor volume of the working fluid is decreased by injecting a predetermined volume of liquid into the working fluid adjacent the entrance region of the magnetic field so that the vapor portion of the working fluid is reduced.

3. The method of claim 1 in which the vapor volume of the working fluid is decreased by increasing the working fluid pressure adjacent the entrance region of the magnetic field so that the vapor portion of the working fluid is reduced.

4. The method of claim 1 in which the vapor volume of the working fluid is decreased by increasing the working fluid pressure and injecting a predetermined volume of subcooled liquid into the working fluid adjacent the entrance region of the magnetic field.

5. In an improved magnetohydrodynamic generator, the method of generating electricity comprising:
    (a) passing an electrically non-conductive working fluid through a magnetic field having entrance and exit regions,
    (b) decreasing the vapor volume of the working fluid adjacent the entrance region of the magnetic field so that the electrically non-conductive working fluid becomes electrically conductive,
    (c) extracting electrical energy from the interaction of the electrically conductive working fluid and the magnetic field, and
    (d) increasing the vapor volume of the working fluid adjacent the exit region of the magnetic field so that the electrically conductive working fluid becomes electrically non-conductive.

6. The method of claim 5 in which the vapor volume of the working fluid is decreased by injecting a predetermined volume of liquid into the working fluid adjacent the entrance region of the magnetic field and the vapor volume of the working fluid is increased by injecting a predetermined volume of vapor into the working fluid adjacent the exit region of the magnetic field so that the working fluid is electrically conductive within the magnetic field.

7. The method of claim 5 in which the vapor volume of the working fluid is decreased by increasing the working fluid pressure adjacent the entrance region of the magnetic field and the vapor volume of the working fluid is increased by decreasing the working fluid pressure adjacent the exit region of the magnetic field so that the working fluid is electrically conductive within the magnetic field.

8. The method of generating electricity comprising:

(a) passing a substantially electrically non-conductive working fluid having liquid and vapor phases through a magnetic field having entrance and exit regions, (b) decreasing the vapor volume of the working fluid adjacent the entrance region of the magnetic field including the steps of
(i) increasing the working fluid pressure, and
(ii) injecting a predetermined volume of subcooled liquid into the working fluid,
so that the electrically non-conductive working fluid becomes substantially electrically conductive, (c) extracting electrical energy from the interaction of the electrically conductive working fluid and the magnetic field, and (d) increasing the vapor volume of the working fluid adjacent the exit region of the magnetic field including the steps of
(i) decreasing the working fluid pressure, and
(ii) injecting a predetermined volume of vapor into the working fluid,
so that the electrically conductive working fluid becomes substantially electrically non-conductive, said electrically non-conductive working fluid at said entrance and exit regions substantially reducing end losses.

9. An improved magnetohydrodynamic energy conversion system for generating electricity comprising:
(a) first energy conversion means developing a high velocity, electrically non-conductive working fluid,
(b) second energy conversion means,
(c) conduit means cooperating with said first and second energy conversion means and passing said working fluid therethrough,
(d) an entrance region and an exit region defined by said second energy conversion means,
(e) first injection means cooperating with said entrance region for the injection of a predetermined volume of liquid into said working fluid so that the electrical characteristics of said working fluid are altered from electrically non-conductive to electrically conductive,
(f) said second energy conversion means extracting electrical energy from said electrically conductive working fluid, and
(g) second injection means cooperating with said exit region for the injection of a predetermined volume of vapor into said working fluid so that the electrical characteristics of said working fluid are altered from electrically conductive to electrically non-conductive so that said electrically non-conductive working fluid at said entrance and exit regions of said second energy conversion means substantially reduces end losses.

10. An improved magnetohydrodynamic energy conversion system for generating electricity comprising:
(a) a working fluid having at least one vaporizable component,
(b) a heat source vaporizing a portion of said working fluid,
(c) nozzle means in fluid communication with said heat source changing the thermal energy of said partially vaporized working fluid to kinetic energy so that a high velocity, substantially electrically non-conductive working fluid passes from said nozzle means,
(d) a generator means having a magnetic field and external conductors positioned generally perpendicular to each other,
(e) conduit means cooperating with said nozzle means and said generator means and passing said electrically non-conductive working fluid in a flow direction generally perpendicular to each of the magnetic fields and the external conductors,
(f) an entrance region and an exit region in said conduit means defined by the magnetic field,
(g) a source of subcooled liquid,
(h) first regulator means in fluid communication with said source of subcooled liquid,
(i) first injection means cooperating with said entrance region for the injection of a predetermined volume of subcooled liquid from said regulator means into said electrically non-conductive working fluid so that the electrical characteristics of said working fluid are altered from electrically non-conductive to electrically conductive, said injection decreasing the vapor portion of said working fluid,
(j) said generator means extracting electrical energy from said electrically conductive fluid,
(k) a source of vapor-rich fluid,
(l) second regulator means in fluid communication with said source of vapor-rich fluid, and
(m) second injection means cooperating with said exit region for the injection of a predetermined volume of vapor-rich fluid from said second regulator means into said electrically conductive working fluid so that the electrical characteristics of said working fluid are altered from electrically conductive to electrically non-conductive, said electrically non-conductive working fluid at said entrance and exit regions substantially reducing end losses.

11. The system of claim 10 in which said source of vapor-rich fluid is said heat source.

12. An improved magnetohydrodynamic energy conversion system for generating electricity comprising:
(a) first energy conversion means developing a high velocity, electrically non-conductive working fluid,
(b) second energy conversion means in fluid communication with said first energy conversion means,
(c) an entrance region and an exit region defined by said second energy conversion means, and
(d) injection means cooperating with at least one of said entrance and exit regions for the injection of a predetermined volume of liquid into the working fluid at said entrance region and a predetermined volume of vapor into the working fluid at said exit region.

References Cited

UNITED STATES PATENTS

| | | | |
|---|---|---|---|
| 2,210,918 | 8/1940 | Karlovitz et al. | 310—11 |
| 3,080,515 | 3/1963 | Kehoe | 322—2 |
| 3,263,104 | 7/1966 | Brill et al. | 310—11 |

FOREIGN PATENTS

| | | |
|---|---|---|
| 648,937 | 8/1937 | Germany. |

DAVID X. SLINEY, Primary Examiner